(12) United States Patent
Hensley

(10) Patent No.: US 8,773,018 B2
(45) Date of Patent: Jul. 8, 2014

(54) TUNING A DIELECTRIC BARRIER DISCHARGE CLEANING SYSTEM

(76) Inventor: Paul F. Hensley, Moorestown, NJ (US)

( * ) Notice: Subject to any disclaimer, the term of this patent is extended or adjusted under 35 U.S.C. 154(b) by 0 days.

(21) Appl. No.: 13/358,018

(22) Filed: Jan. 25, 2012

(65) Prior Publication Data

US 2012/0187840 A1 Jul. 26, 2012

Related U.S. Application Data

(60) Provisional application No. 61/436,018, filed on Jan. 25, 2011.

(51) Int. Cl.
*H01J 7/24* (2006.01)
(52) U.S. Cl.
USPC ............ 315/111.21; 315/111.01; 315/111.31; 315/111.41
(58) Field of Classification Search
USPC .................... 315/21–41, 111.21; 156/345.43; 204/164
See application file for complete search history.

(56) References Cited

U.S. PATENT DOCUMENTS

| | | | | |
|---|---|---|---|---|
| 4,665,315 A * | 5/1987 | Bacchetti et al. | ........... | 250/492.1 |
| 5,534,070 A * | 7/1996 | Okamura et al. | ......... | 118/723 E |
| 5,540,781 A * | 7/1996 | Yamagami et al. | ....... | 118/723 E |
| 5,589,008 A * | 12/1996 | Keppner | ...................... | 136/259 |
| 6,009,828 A * | 1/2000 | Tomita et al. | ............. | 118/723 E |
| 6,503,816 B2 * | 1/2003 | Ito et al. | ......................... | 438/485 |
| 6,642,149 B2 * | 11/2003 | Suemasa et al. | .............. | 438/710 |
| 6,685,803 B2 * | 2/2004 | Lazarovich et al. | .......... | 204/164 |
| 6,724,608 B2 | 4/2004 | Hensley et al. | | |
| 7,017,594 B2 | 3/2006 | Kurunczi | | |
| 7,307,589 B1 * | 12/2007 | Gregoire et al. | ....... | 343/700 MS |
| 7,367,344 B2 | 5/2008 | Kurunczi | | |
| 8,092,643 B2 | 1/2012 | Kurunczi | | |
| 8,092,644 B2 * | 1/2012 | Kurunczi | ................. | 156/345.43 |
| 8,124,013 B1 * | 2/2012 | Gregoire et al. | ................ | 422/21 |
| 8,237,367 B2 * | 8/2012 | Nonomura et al. | ...... | 315/111.21 |
| 8,312,839 B2 * | 11/2012 | Baek | ..................... | 118/723 MW |
| 8,366,871 B2 * | 2/2013 | Kurunczi | ................. | 156/345.43 |
| 8,405,115 B2 * | 3/2013 | Samoilov et al. | ............... | 257/99 |
| 2006/0201916 A1 * | 9/2006 | Kurunczi | ................ | 219/121.43 |
| 2006/0272675 A1 | 12/2006 | Kurunczi | | |
| 2012/0229029 A1 * | 9/2012 | Takenoshita et al. | .... | 315/111.21 |

OTHER PUBLICATIONS

Walhout, Matthew, Dr., "Research on Pattern Formation in 1D Dielectric-Barrier Discharges," Nov. 6, 2010, calvin.edu/~mwalhout/discharge.htm.

\* cited by examiner

*Primary Examiner* — Douglas W Owens
*Assistant Examiner* — Srinivas Sathiraju
(74) *Attorney, Agent, or Firm* — Pepper Hamilton LLP

(57) ABSTRACT

Apparatus and methods for generating and optimizing a plasma discharge are provided. The device includes a plasma generating device, one or more sensors, and at least one controller for adjusting the plasma in light of the sensed characteristics. Methods for optimizing a plasma, particularly a spatially disoriented plasma discharge include generating a plasma, sensing one or more plasma characteristics, modifying one or more plasma generating properties to optimize the plasma.

9 Claims, 5 Drawing Sheets

TUNING A DIELECTRIC BARRIER DISCHARGE CLEANING SYSTEM

CROSS-REFERENCE TO RELATED APPLICATIONS

This application claims priority to U.S. Provisional Patent Application No. 61/436,018 filed Jan. 25, 2011 entitled "Tuning A Dielectric Barrier Discharge Cleaning System," which is hereby incorporated by reference in its entirety.

FIELD

This disclosure relates to systems and methods for tuning a plasma discharge. In some embodiments systems and methods for creating and optimizing a spatially disoriented plasma discharge and other types of atmospheric pressure plasmas.

BACKGROUND

Dielectric barrier discharge plasma devices can be used to create ozone and ionic cascades. The plasma devices can be used in conjunction with liquid handling and transfer systems for cleaning and sterilization of the liquid delivery devices, e.g. pipette tips. Plasma discharge devices may be used to clean pipette tips on liquid handling and transfer systems that are used to transfer or otherwise manipulate liquids between two containers. Such systems are commonplace in the pharmaceutical and biotechnology industries. During the liquid handling and transfer process, the delivery devices, e.g. pipette tips, require cleaning, drying, sterilization or other such effects. These effects can be accomplished by exposure to atmospheric pressure plasma. In many instances, particularly in the pharmaceutical, biotechnology, and other research areas, the types, shapes, and sizes of the containers have been standardized.

In many systems, the pipette tips (or other object to be cleaned) are arranged in a known pattern or array, which corresponds to a similar pattern or array used for the containers. For example, the industry standardized microtitre arrays call for specific distances and spacing depending on the number of wells in a microtitre plate. Consequently, liquid handling devices use those standardized measurements to arrange their pipette tips. In turn, plasma discharge devices used to clean the pipette tips are also similarly configured. In most instances, the dielectric barriers are arranged such that they can accept the object to be cleaned (pipette tips) in their known arrangement (e.g. microtitre array). Although we focus here on the microtitre array, any pre-established arrangement can be used. For example, rather than a microtitre array, a test-tube rack of standardized dimensions and spacing could be used to determine both the spacing of the pipette tips as well as the arrangement and sizing of the plasma generating device, both itself and its components. In some arrangements, the plasma generating device occupies the same footprint as a microtitre plate that it is meant to emulate.

As is known in the art, the generation of plasma is dependent upon a number of factors, including but not limited to power input, changing the frequency, gas flow, etc. Disclosed herein are methods to optimize plasma generation such that substantially the entire gap between adjacent dielectric barriers is filled with plasma. This can be achieved by obtaining spatially disoriented plasma discharge and other types of atmospheric pressure plasmas.

The article "Research on Pattern Formation in 1D Dielectric-Barrier Discharges" by Dr. Matthew Walhout, Nov. 6, 2010 incorporated herein by reference in its entirety, describes techniques to measure the plasma discharges to allow one to determine if the plasma is disordered. The Walhout article describes a one dimensional system and analysis. It is effectively two wires that run in parallel. Walhout indicates that in his one dimensional system, spatial disorientation is achieved by overpowering the system (i.e. voltage>1250 v, see p 5/10) and in a narrow range of driving voltage (i.e. 940-980 v, see p. 5/10).

There is a need in the art to provide more methods to achieve and maintain desired plasma characteristics. Methods and systems to achieve these and other goals are disclosed herein.

SUMMARY

Some embodiments provide a plasma discharge cleaning device comprising a plasma generating device, having one or more controllers for modifying one or more plasma generating parameters; and one or more sensors for sensing one or more plasma characteristic. the device may further comprise one or more electrical components selected from pre-amplifiers, microprocessors or computers, and computer algorithms for the collection and analysis of sensor data from a device that is used for generating plasma.

In some embodiments, the one or more sensors are selected from an acoustic an acoustical sensor, an optical sensor, electrical frequency sensor, or combination thereof. Any suitable sensor or combination of sensors may be used. Suitable sensors includes any device that directly or indirectly measures frequency characteristics of the frequencies generated by the device.

In some embodiments, at least one of the sensors is measuring electrical frequencies of at the plasma generator or the amplifier providing the power to the cleaning station or both.

In some embodiments, the sensors are used to measure at least a portion of the spectrum of energy of the entire device generating the plasma.

Some embodiments include a microprocessor capable of analyzing the frequencies that are derived from the one or more sensors.

Some embodiments provide a method for tuning a plasma discharge, the method comprising generating a plasma discharge; sensing one or more characteristic of the plasma discharge; comparing the one or more sensed characteristic to a known standard; and adjusting one or more plasma generating parameter in light until the one or more sensed characteristic satisfies the known standard.

In some embodiments, the one or more characteristic is selected from an acoustic characteristic, an optical characteristic, a frequency characteristic, or a combination thereof.

In some embodiments, the one or more plasma generating parameter is selected from gap distance, z axis height of the discharge zone, y length of the discharge zone, dielectric barrier angle, frequency, power input, and combinations thereof.

Some embodiments disclosed herein facilitate finding and maintaining a spatially disoriented plasma and other types of atmospheric pressure plasmas, preferably in the lowest power range possible, rather than by overpowering the system.

Some embodiments facilitate finding and maintaining a uniform plasma, although it might not be optimized.

Embodiments of the present design have two dimensional characteristics so that there is disorder in two axes. Two dimension characteristics provide an improvement over one dimensional because if you don't have disorder, you do not have plasma evenly spread up and down. Thus two dimension disorder resulting from the techniques of the present invention help ensure plasma is spread evenly in two dimensions.

BRIEF DESCRIPTION OF THE DRAWINGS

The drawings submitted herewith show some embodiments or features of some embodiments encompassed by the disclosure. The drawings are meant to be illustrative and are not intended to be limiting. Like reference numeral refer to like elements through the drawings.

Figure 1:
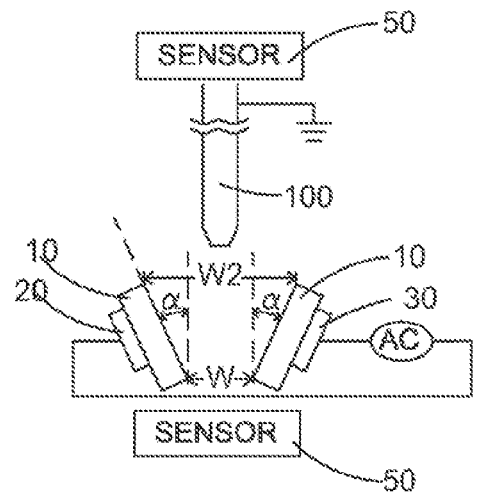
FIG. 1 is a cross-sectional view of a pair of angled dielectric plates.
Figure 2:
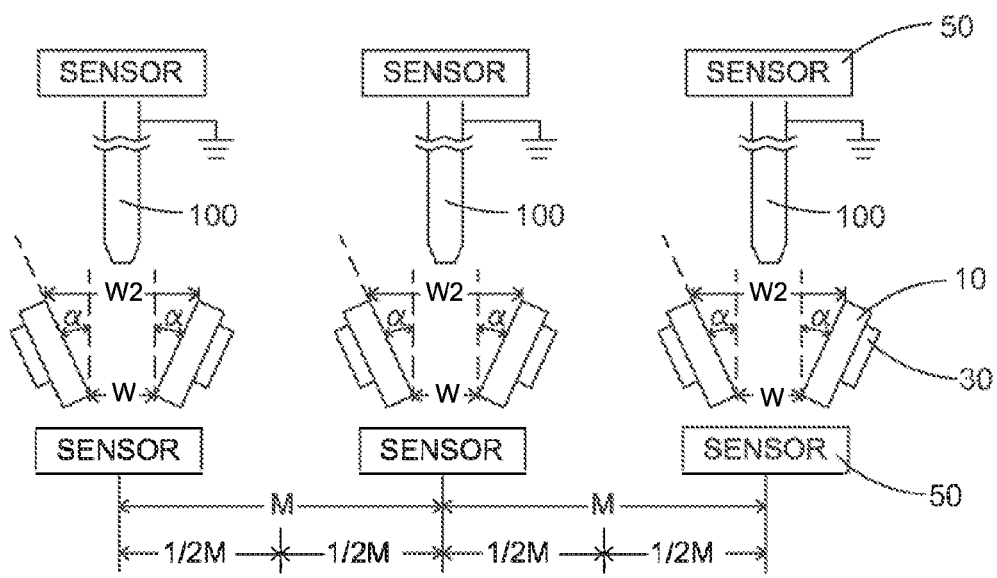
FIG. 2 is a cross-sectional view of several pairs of angled dielectric plates arranged in a known spaced arrangement.
Figure 3:
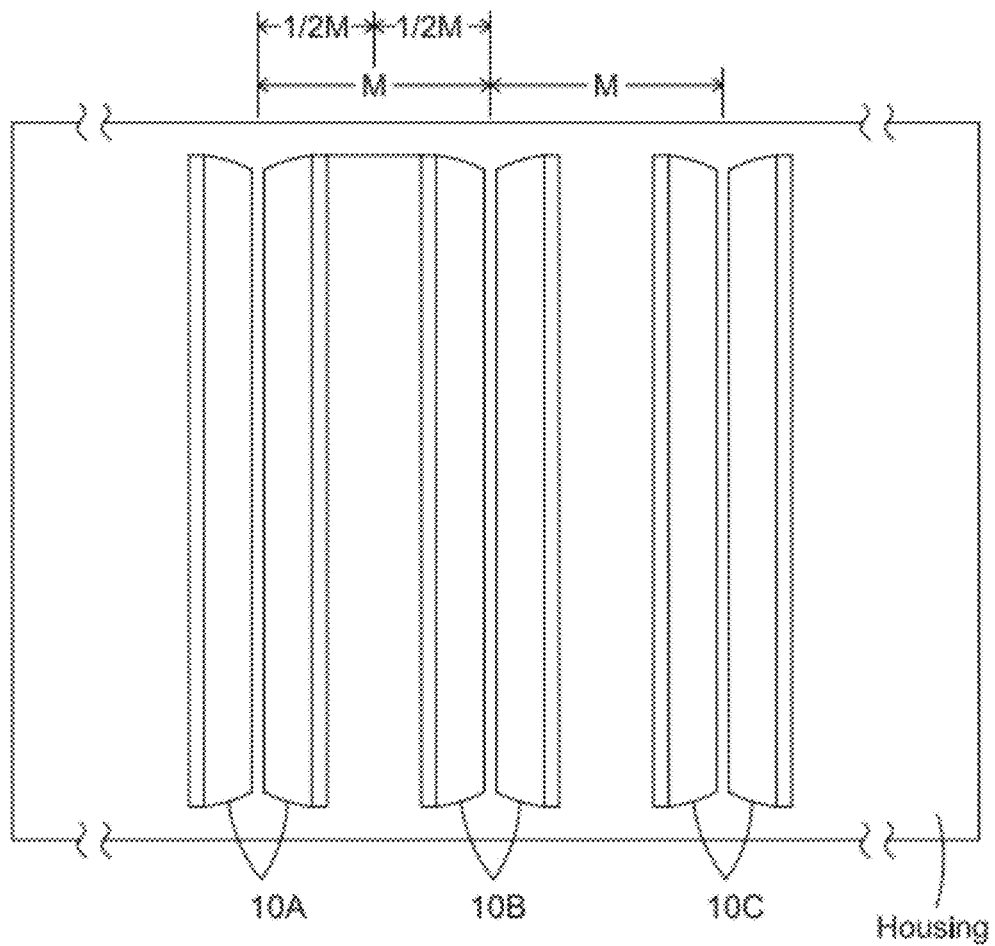
FIG. 3 is a plan view of a cleaning apparatus employing the dielectric plates of FIG. 2.

The schematics in FIGS. 1, 2, and 3 do not include all electrical connections for ease of viewing and clarity. Those of skill in the art will readily recognize the appropriate electrical configurations.

DETAILED DESCRIPTION

The systems and methods disclosed herein can be used to manually or automatically optimize the selection of tuning frequency and/or other parameters used with a dielectric barrier discharge device used to clean pipetting systems or other labware and perform other analysis of the frequency output for quality control, real-time performance verification and similar functions. Suitable dielectric barrier discharge devices are described in, for example U.S. Pat. No. 6,724,608 entitled "Method for Plasma Charging a Probe"; U.S. Pat. No. 7,017,594 entitled "Atmospheric Pressure Non-Thermal Plasma Device to Clean and Sterilize the Surfaces of Probes, Cannulas, Pin Tools, Pipettes and Spray Heads"; U.S. Pat. No. 7,367,344 entitled "Atmospheric Pressure Non-Thermal Plasma Device to Clean and Sterilize the Surfaces of Probes, Cannulas, Pin Tools, Pipettes and Spray Heads"; U.S. patent application entitled "Method and Apparatus for Cleaning and Surface Condition Objects Using Plasma," Ser. No. 11/143,552; U.S. patent application entitled "Method and Apparatus for Cleaning and Surface Conditioning Objects Using Plasma," Ser. No. 11/142,988; U.S. patent application entitled "Method and Apparatus for Cleaning and Surface Conditioning Objects Using Plasma," Ser. No. 11/421,983; and U.S. patent application entitled "Method and Apparatus for Cleaning and Surface Condition Objects Using Plasma," Ser. No. 11/421,977, each of which is incorporated herein by reference in its entirety.

The tuning of narrow parallel plates has been well characterized in what is referred to as "one dimensional" systems, which commonly shows several types of discharge characteristics (see e.g. Walhout). A V-shaped design exhibits very different characteristics primarily due to the range of gap distances between the two plates, creating a "two dimensional" system. At most frequencies, the discharge generated by the application of a high voltage alternating current to the electrodes in the dielectric material will generate discharges at the point of the narrowest gap between the plates. Energy that is not converted to ionization will alternatively be released as heat, which is not a desired outcome. Changes to the driving frequency can raise or lower the point at which the discharge from the surface of the dielectric material occurs in a manner similar to one dimensional systems.

At certain frequencies, the ionization creates what is referred to as spatially disordered plasma. The difference is that at those certain frequencies an alternate physical process of plasma creation occurs. The normal process is for one or two points in each half of the AC wave form to trigger the discharge to occur. At certain transitional frequencies between the single and dual point of discharge, the generation of discharges occurs at a much higher rate and over a substantial percentage of the AC waveform in a disordered pattern. The result is that instead of the discharge occurring only at regular intervals along the narrowest point or one other point in the "V" between the dielectric plates, it occurs at spatially disordered nodes along both the horizontal and vertical axes of the "V" structure in the device thereby filling the space with plasma.

A spatially disordered plasma will generate different frequency characteristics over the range of about 100 Hz to about 20,000 Hz when compared to a non-spatially disordered plasma using a dielectric barrier discharger process. The exact measurements depend on, for example, the gap distance, z axis height of the discharge zone, y length of the discharge zone and the angle of the dielectric barriers relative to themselves and other physical parameter that has been included in the dielectric barrier device. By adjusting one or more of these parameters, the spatial disorder can be optimized, thus optimizing the amount of plasma generated between the dielectric plates. Sub-optimal tuning of non-spatially disoriented plasma can similarly be achieved.

The frequency characteristics will show peaks for each gap distance over the range allowing for spacing between discharges of less than about 0.01 mm to more than about 1.0 mm in the z axis.

As the input frequency of the AC driver current is increased through the range of which dielectric barrier discharges occur, the number of peaks above background in a spectral analysis of the frequencies will increase at the point of maximum generation of spatially disorder plasma generation.

The same process can be used to identify the frequency or frequencies that produce the minimum amount of heat from the dielectric barrier discharge.

In one embodiment, the frequency characteristics are measured using one or more sensors that are internal to the housing holding the dielectric barrier discharge device.

In another embodiment, the frequency characteristics are measured using one or more sensors that are external to the housing holding the dielectric barrier discharge device.

In another embodiment, the high voltage frequency is measured with a sensor device, such as an oscilloscope.

The frequency characteristics can be measured and analyzed by devices known to one practiced in the art of frequency measurement and analysis, including but not limited to all types of sound pickup devices, optical sensors, and similar; and analyzed using commercial or custom software, or analog and digital processors, for example.

In some embodiments, the frequency characteristics from the sensors can be analyzed for changes that would indicate variations in the generation of the dielectric barrier discharge, which could indicate conditions including but not limited to partial or complete cessation of the dielectric barrier discharge, attenuation of the dielectric barrier discharge due to deposits on the surface of the dielectric barrier, or some type of systemic or electrical failure of the hardware generating the dielectric discharge.

In one embodiment, as depicted in FIGS. 1-3, the plasma generating device uses one or more sets of two dielectric plates that are positioned parallel to each other and several degrees (typically from about 1 to about 5 degrees) off vertical so as to provide a truncated "V" shaped trough for the cleaning process to be performed. The plates do not actually touch, even at the bottom of the "V". The system is operatively coupled to a voltage source as is known in the art to produce a plasma. In such systems having a "V" shape, or any system where the gap is not uniform, a spatially disoriented plasma ensures that the entire, or substantially the entire, gap is filled with plasma. Thus, in such systems optimizing the system to generate a spatially disoriented plasma is important.

FIG. 1 depicts a cross-section of a single pair of dielectric barrier members, 10, in a plasma discharge device. The dielectric barrier members 10 are coupled via appropriate electrodes 20, 30 to a power source 40 in an arrangement suitable for generating a plasma discharge. As shown in the figure, each dielectric barrier 10 is about 1.5 to 2.5 degrees (angle α) off vertical, creating the truncated V-shaped cross-section, having a width W2 at the top and W1 at the bottom. This V-shaped trough is well-suited for accepting the object to be cleaned, e.g. pipette tip and for creating a spatially disoriented plasma discharge. In the embodiment depicted, two sensors 50 are shown, above and below the plasma generator. Any number and arrangement of sensor is possible, this combination is shown as exemplary. The object to be cleaned, e.g. pipette 100, is shown prior to entering the plasma discharge area A. FIGS. 1 and 2 also show the pipette tip as electrically grounded. Those of skill in the art will appreciate that the pipette tips, or other object to be cleaned may be grounded or ungrounded, depending upon the handling apparatus.

Figure 5:
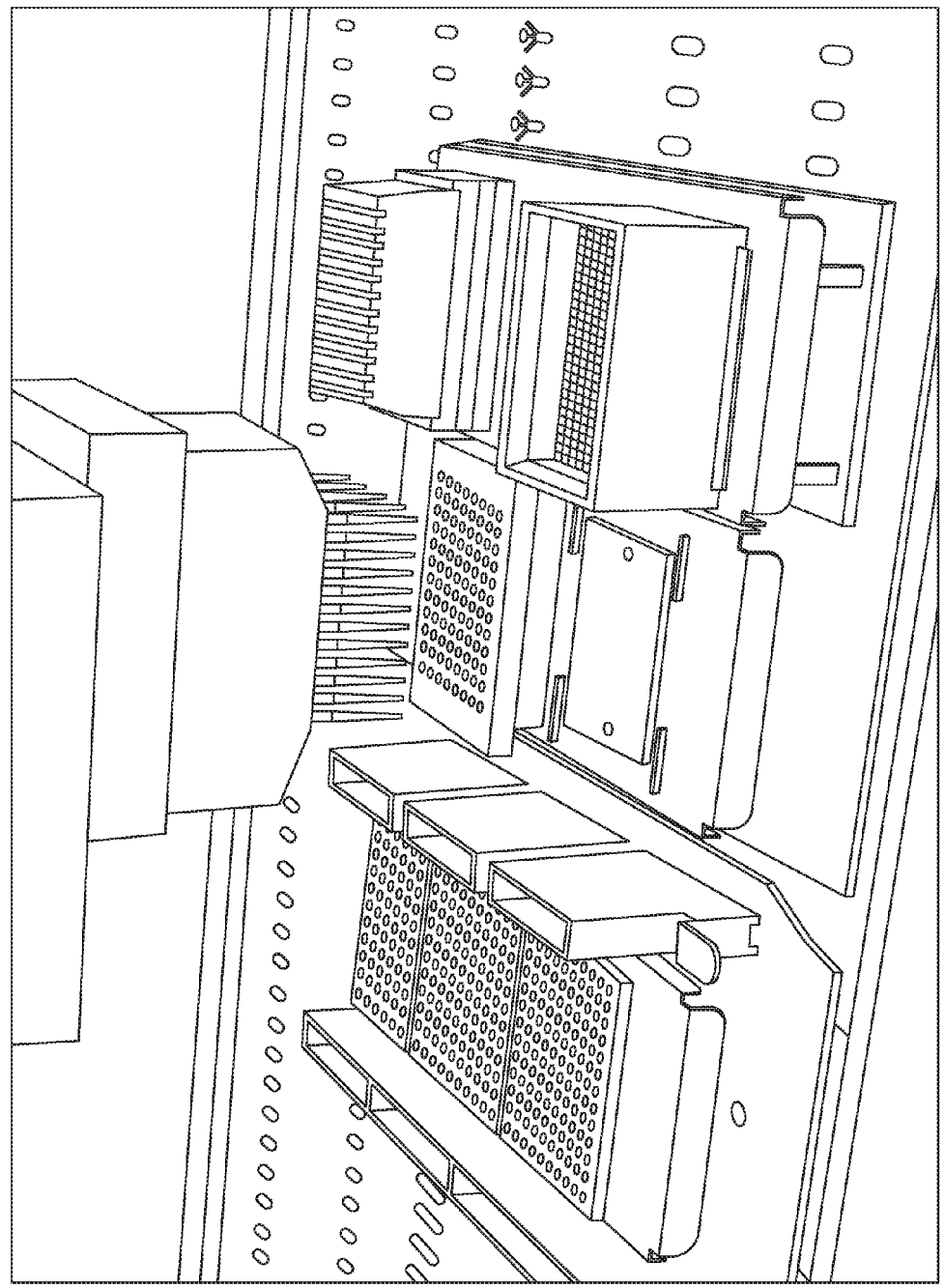
FIGS. 5 and 6 show plasma cleaning device in position within the larger fluid handling device.
Figure 6:
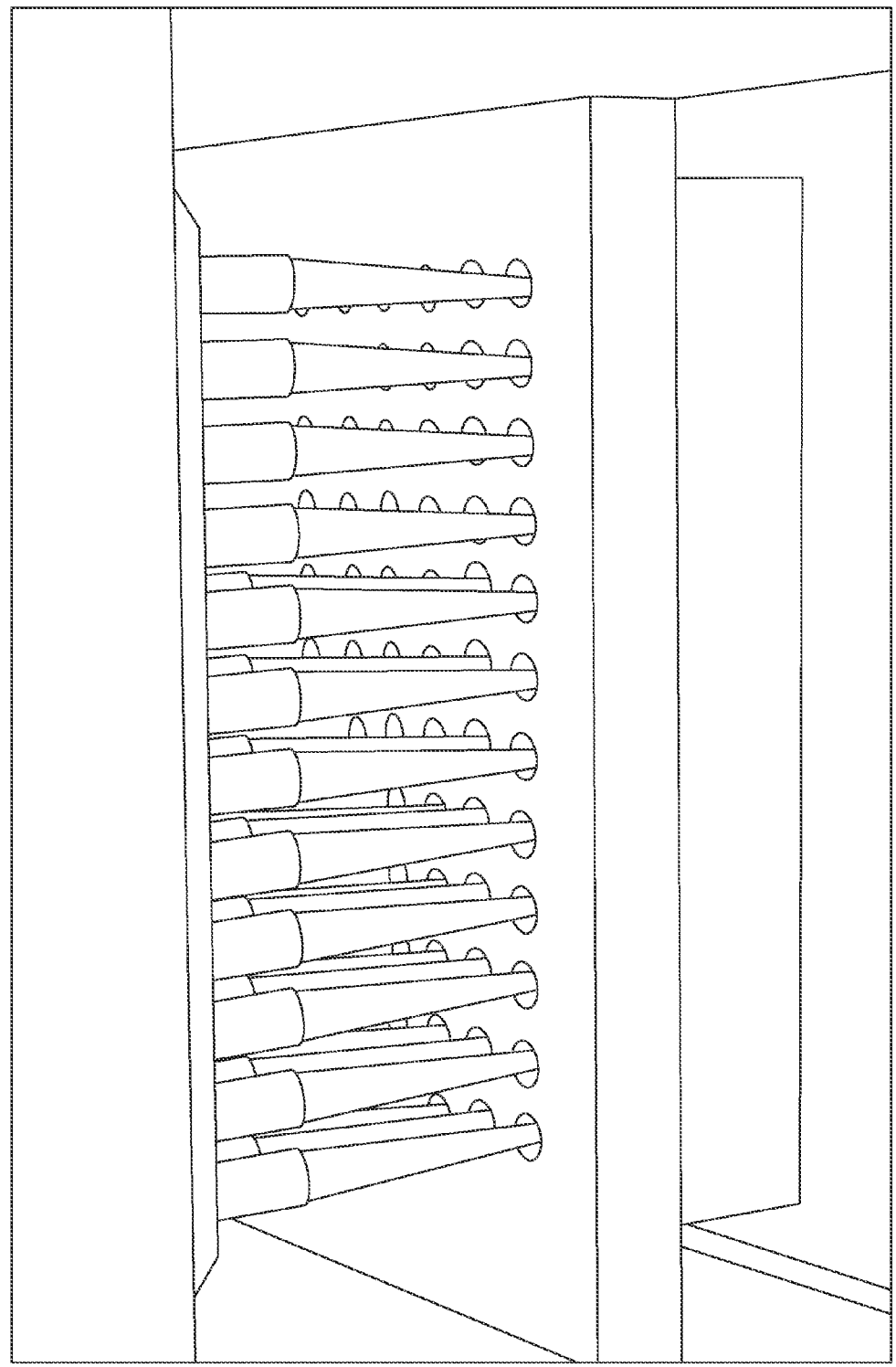

FIG. 2 shows three dielectric barrier pairs similar to FIG. 1 with spacing indicated. As will be appreciated, any number of dielectric pairs can be used to generate a desired number of rows. The distance M is meant to designate a standardized distance between plasma generating dielectric barrier pairs. For example, M can represent the standard distance between wells, and thus pipettes, in a standard microtitre array. FIG. 3 shows a plan view of a plasma discharge device, showing three dielectric barrier pairs 10A, 10B, and 10C; the sensors, pipette tips and electronics have been removed for clarity. FIG. 3 also includes a housing, within which the plasma generating device can be housed. The housing in some embodiments approximates the dimensions of a standardized plate such as a microtitre plate. As such, and as seen in FIGS. 5 and 6, with such a configuration, the plasma device can be placed in an industry standard liquid handling apparatus and be treated as any other microtitre plate, thus, the liquid handling device would need no special modification, except perhaps programming to facilitate proper cleaning, sampling, dispensing sequences.

As noted, the system is provided with at least one sensor, and preferably a plurality of sensors to sense one or more characteristics of the generated plasma. The sensor can be coupled to a microprocessor or computer to capture and analyze the data. The data is compared to a known standard. The standard may be a "seed" standard established at the manufacturer or may be a historical standard developed in situ taking into account the devices actual operating conditions and location, or a combination of both. The comparison may be manual or performed via a computer analysis. In the event that comparison reveals a difference, any or all parameters such as power, frequency, gas flow, etc. can be modified until the desired characteristic is achieved. It should be appreciated that the modification of some or all of the parameters may be manually adjusted or automatically adjusted via computer control.

One example of the method of tuning a dielectric barrier discharge device is through the use of sound volume to determine whether the hardware device is consistently generating the same volume of sound (e.g., a constant volume of sound) and a uniform sound with an acoustic measurement of the dB of sound being generated, thereby confirming that the same quantity of plasma is being generated and that no extraneous material is altering the plasma generation process. In another embodiment, this same measurement can be done optically by measuring the number of electron streamers in the dielectric discharge which are generated per unit of time. This same measurement can be done using measurements from the high voltage delivery line to the dielectric barrier by analyzing the frequency spectrum versus amplitude manually off an oscilloscope or automatically with other similar techniques.

Figure 4:
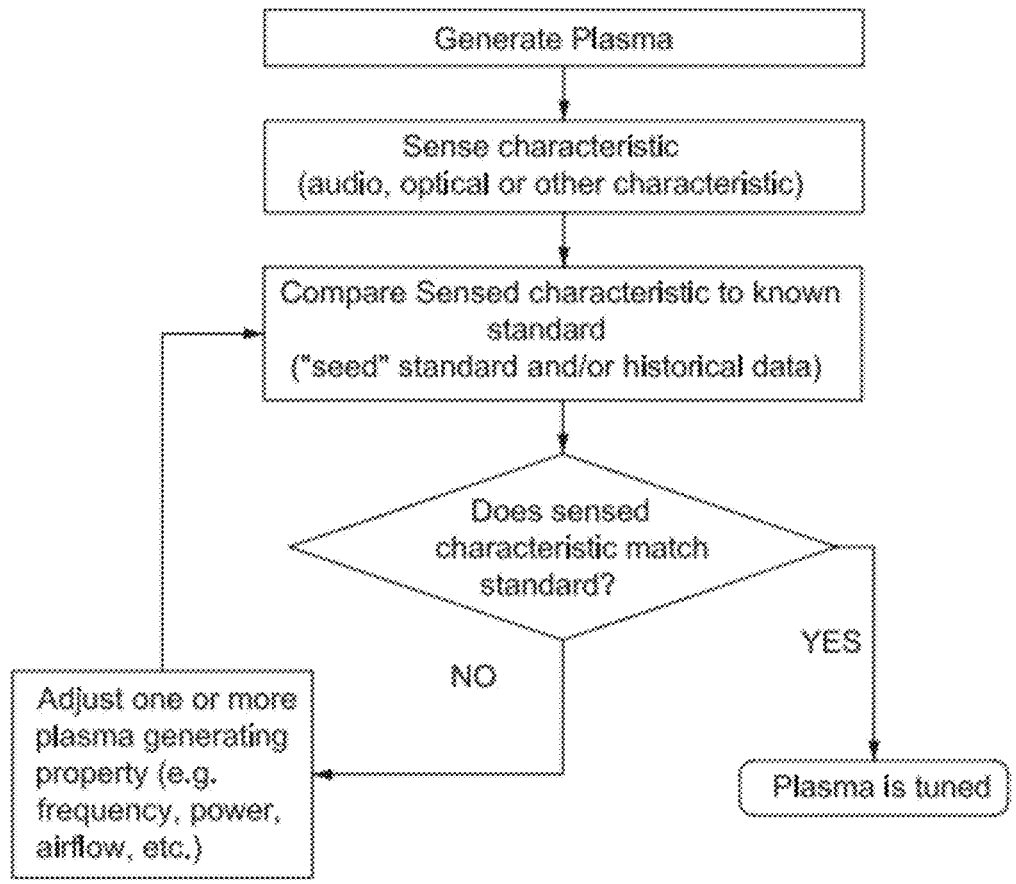
FIG. 4 is a flowchart of the sensing and optimizing process described herein.

In yet another embodiment, other characteristics of the dielectric discharge can be measured by, for example, performing a Fast Fourier Transformation (FFT) of the acoustic measurement. In this instance, the FFT data will show an increase of small intermediate peaks between large peaks associate with harmonics of the drive frequency. As the system approaches maximum spatial disorientation (and therefore tuning), the number of the small peaks rises. The system is tuned when those small peaks are at their maximum. Thus, through continued sensing and adjusting, the desired plasma generating parameter (e.g. frequency) or combination of parameters can be achieved (see flowchart in FIG. 4.)

Those same characteristics can be determined by measuring electron streamer duration optically. Those same characteristics can be determined by the analysis of the frequency spectrum from the high voltage line.

In one embodiment, the optical sensors measure the spectrum of energy of the entire device.

In another embodiment, a dedicated sensor for each pair of dielectric barriers and each pair is monitored separately and in groups for the entire station.

In another embodiment, the optical sensors measure frequency using one or more sensors that are internal to the housing holding the dielectric barrier discharge device.

In other embodiments, the optical sensors measure frequency using one or more sensors that are external to the housing holding the dielectric barrier discharge device.

In other embodiments, a sensor is attached to the high voltage delivery line between the high voltage generating circuitry and the dielectric barrier or as an integrated component of the high voltage generating circuitry.

The frequency characteristics may be measured and analyzed by devices known to one practiced in the art of frequency measurement and analysis.

The methods herein detect the frequencies where the spatially disordered plasma is the type of discharge generated and other characteristics of the plasma. The application also includes systems, devices and methods for detecting, tuning, and/or generating spatially disordered plasma.

The application also discloses that acoustic, optical, electrical frequency and other methods can be used to analyze the dielectric barrier discharge process.

In some embodiments, an acoustic sensor is used. In such instances, the acoustic sensor can be a ceramic piezo electric type but any microphone or other sound pickup device, including such systems that pick up sound vibrations from solid material, and that can withstand intense sound volume and the harsh environment will suffice. A wide range of peizo electric sensors and condenser microphones and a number of others types are all suitable, and have worked in lab testing. The high dB levels (nominally 100 to 120 dB) and harsh environments have destroyed some but all worked.

In some embodiments, one or more light sensor can be used. The light sensor we can use fiber optics to bring out information from each channel for intensity and spectral analysis using systems that are known to those practiced in these arts. One can also use camera type light sensors which could be mounted below (i.e. looking up) into the plasma.

Other sensors include devices that provide electrical spectrum analysis and wave harmonic analysis of reflected energy from the dielectric barrier. Again, sensor systems that are known to those practiced in these arts.

Although the invention is described herein with respect to optimizing a spatially disoriented plasma, the same techniques can be used to monitor other types of generated plasmas including, but not limited to, other types of atmospheric pressure plasmas. In particular, the standard for comparison may be set to any desired standard for a particular plasma characteristic. For example, if for some reason, a less than optimized spatially disoriented plasma is desired, once the desired plasma is obtained, data for that plasma can be stored and used as the standard, ensuring that the plasma is reproduced and/or maintained in the future. For example, if there were a need for a plasma having a Type A profile (discussed, e.g., in Walhout) that plasma could be generated, and its characteristic data (e.g. sound data) recorded for later comparison so that the plasma can be maintained at that profile. It is also contemplated that real time analysis during use could be conducted to ensure the proper plasma is maintained. In the event the generated plasma falls outside of the standard, the user could be informed.

The system disclosed herein can also be used with any type of plasma generating device and cleaning devices in particular, as a maintenance or quality control measure. If the device becomes contaminated or unclean, the sensor will pick up on abnormal signals, either as abnormal sounds (e.g. clicks, pops, and hisses) or in abnormal optical cues, etc. depending upon the sensor type. Such indications can be reported via the attached computer, indicating that the system needs servicing or maintenance.

Additionally, although the optimization of spatial disorientation is important to non-uniform gapped set ups, the optimization of spatial disorientation may also be employed in other arrangements. For example in a parallel plate arrangement, optimizing spatial disorientation will ensure that the entire, or substantially the entire, gap is filled with plasma—that is from top to bottom along its length. Non-spatially disoriented plasmas will likely fill most of the space, but a spatially disoriented plasma is more likely to fill the space.

FIGS. 5 and 6 are provided to illustrate a typical liquid handling device, a plurality of microtitre plates, the liquid reservoir, pipette tips, and plasma cleaner. FIG. 6 shows a close up of the plasma cleaning device with the array of pipettes entering the device. As shown, a perforated cover is employed covering the dielectrics and other members inside the cleaning device. Other arrangements are, of course, possible.

What is claimed is:

1. A plasma discharge cleaning device for use with a fluid handling device comprising:
   a plasma generating device, having one or more controllers for modifying one or more plasma generating parameters; and
   one or more sensors, independent of the fluid handling device, for sensing one or more plasma characteristic.

2. The device according to claim 1, further comprising one or more electrical component selected from pre-amplifiers, microprocessors or computers, and computer algorithms for the collection and analysis of sensor data from a device that is used for generating plasma.

3. The device according to claim 1 wherein the one or more sensors are selected from an acoustical sensor, an optical sensor, electrical frequency sensor, or combination thereof.

4. The device of claim 1, wherein at least one of the one or more the sensors is measuring electrical frequencies of the plasma generator or the amplifier providing the power to the cleaning station or both.

5. The device of claim 1, wherein the sensors are used to measure at least a portion of the spectrum of energy of the entire device generating the plasma.

6. The device of claim 1, wherein one or more sensors comprises any device that directly or indirectly measures frequency characteristics of the frequencies generated by the device.

7. The device of claim 1, further comprising a microprocessor capable of analyzing the frequencies that are derived from the one or more sensors.

8. A method for tuning a plasma discharge cleaning device for use with a fluid handling device, the method comprising: generating a plasma discharge; sensing one or more characteristic of the plasma discharge independent of fluid handling device; comparing the one or more sensed characteristic to a known standard; adjusting one or more plasma generating parameter which is selected from gap distance, z axis height of the discharge zone, y length of the discharge zone, dielectric barrier angle, frequency, power input, and combination thereof, until the one or more sensed characteristic satisfies the known standard.

9. The method of claim 8, wherein the one or more characteristic is selected from an acoustic characteristic, an optical characteristic, a frequency characteristic, or a combination thereof.

* * * * *